(12) United States Patent
Luong

(10) Patent No.: US 6,314,105 B1
(45) Date of Patent: Nov. 6, 2001

(54) METHOD AND APPARATUS FOR CREATING AND DISMANTLING A TRANSIT PATH IN A SUBNETWORK

(75) Inventor: Steven V. Luong, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/081,526

(22) Filed: May 19, 1998

(51) Int. Cl.$^7$ ................................ H04L 12/28; H04J 1/16

(52) U.S. Cl. ...................... 370/395; 370/237; 370/468; 709/239

(58) Field of Search ......................... 370/216–228, 370/231–237, 400–402, 468, 395, 253, 392; 709/223–229, 232–239; 379/220–221; 710/291

(56) References Cited

U.S. PATENT DOCUMENTS

| 5,402,478 | * | 3/1995 | Hluchyj | ............................ | 379/220 |
| 5,854,899 | * | 12/1998 | Callon et al. | .................... | 370/235 |
| 5,953,312 | * | 9/1999 | Crawley et al. | .................. | 370/218 |

\* cited by examiner

*Primary Examiner*—Wellington Chin
*Assistant Examiner*—Steven Nguyen
(74) *Attorney, Agent, or Firm*—Beyer Weaver & Thomas, LLP

(57) ABSTRACT

A system and method are disclosed for determining when to set up or tear down such a temporary transit path so that temporary transit paths are set up when they are needed and torn down when they are no longer needed. A temporary transit path is set up when the bit rate exceeds a first threshold. The temporary transit path is torn down when the bit rate is less than a second threshold. The temporary transit path is set up or torn down between a source station's router and a next hop router. The temporary transit path is set up within a subnetwork that includes the source station, the next hop router, and an intermediate router that is interconnected by a plurality of permanent transit paths to the source station and the next hop router. In one embodiment, a method for creating a temporary path for data packet transmission in the subnetwork is disclosed. Transmission of the data packets is initiated over the permanent transit paths that are coupled between the source station and the next hop router. A bit rate of the data packets from the source station to the next hop router is measured after initiating the transmission. Data packets transmission over the permanent transit paths is continued when the measured bit rate is below a first predetermined value. A temporary transit path between the source station and the next hop router is created when the measured bit rate is above the first predetermined value. The data packets are transmitted over the created temporary transit path when the measured bit rate is above the first predetermined value. In a preferred embodiment, the bit rate is measured again after creating the temporary transit path and transmitting the data packets over the created temporary transit path. The created temporary transit path is torn down when the bit rate is below the second predetermined value. Transmission of the data packets is sent over the permanent transit paths from the source station to the next hop routers once the temporary transit path is torn down.

24 Claims, 7 Drawing Sheets

METHOD AND APPARATUS FOR CREATING AND DISMANTLING A TRANSIT PATH IN A SUBNETWORK

BACKGROUND OF THE INVENTION

1. Field of the Invention

The present invention relates generally to methods and apparatuses for routing data (referred to as "packets") from a source station to a destination station. More specifically, the invention relates to methods and apparatuses for creating and dismantling a temporary transit path between two routers of a subnetwork. The packets may then travel from the source station along one or more of the temporarily created transit paths to the destination station.

2. Description of the Related Art

One type of network that is used for transmitting data packets is referred to as a connection-oriented network. A connection-oriented network provides mechanisms for a source station to send data packets along a specific path to a destination station. In contrast, a connectionless network (e.g., the Internet) does not provide specific routes, but rather sends data through various paths that eventually reach the destination station. The connection-oriented network is less likely to lose related data packets than the connectionless network. The data packets in a connection-oriented network are typically sent over either a temporary transit path or a permanent transit path. For example, in an ATM (asynchronous transfer mode) or X.25 network, a temporary transit path in the form of a switched virtual circuit (SVC) may be created, or a permanent transit path in the form of an existing permanent virtual circuit (PVC) may be utilized.

FIG. 1A is a diagrammatic representation of a conventional connection-oriented subnetwork 132. As shown, the subnetwork 132 includes a plurality of routers A (118), B (116), and C (108). The subnetwork 132 also includes a source station 126 (a host or router) that is associated with the subnetwork 132 through router A and a destination station 102 (a host or router) that is associated with the subnetwork 132 through router C 108.

A particular router is defined as a member of a subnetwork when the particular router is capable of communicating with other routers within the subnetwork. For example, within a non-broadcast, multi-access (NBMA) subnetwork, routers that have common network identifiers are capable of communicating with each other within the same NBMA subnetwork. For example, each of the routers A, B, and C may have a common network identifier. Thus, routers A, B, and C may communicate with each other to form the subnetwork 132.

Data packets may be transmitted from the source station 126 to the destination station (or visa versa) by utilizing the Next Hop Resolution Protocol (NHRP) for NBMA subnetworks. Specifically, NHRP may be used by a source station's router to determine the addresses of the "next hop" towards a destination station. If the destination station is a member of the same subnetwork as the source station, the next hop is the destination station or the destination station's router. After the next hop is determined, a switched virtual circuit (SVC) is setup between the source station's router and the next hop.

An SVC is a specific type of temporary transit path between two routers or hosts that may be created and dismantled within the connection-oriented subnetwork. In other words, a source station may setup and hang-up a call to a destination station or destination station's router as needed. In contrast, a permanent virtual circuit (PVC) permanently couples two routers or hosts together. That is, a transit path for data communication is permanently set up between two routers or hosts.

As shown, when data packets are sent from the source station 126 to the destination station 102, router A may utilize NHRP to send out a next hop request packet. The request packet travels along PVC's to the destination station 102. Specifically, the request packet travels along PVC 122 to router B, and router B forwards the request packet along PVC 120 to router C, which is associated with the destination station 102. Since router C is coupled to the destination station 102, it is the "next hop" router. Thus, router C sends back a next hop reply to the source station 126 in response to the request packet. An SVC 124 is then setup between router A and C thereby bypassing router B.

By default, NHRP is set up to determine the next hop and create an SVC for each data packet that is sent between a source station and a destination station. However, this default setup has the disadvantage of utilizing significant resources, such as time and memory, to create unnecessary SVC's. An alternative to using the NHRP default is to configure the source station's router to send a next hop request only when a specific number of data packets have been sent from the source station to the destination station through the PVC's. Thus, an SVC would only be created when the packet quantity reaches a significant level. That is, an SVC would be created after a specific number of packets were sent from the source station to the destination station.

FIGS. 2A and 2B are flowcharts illustrating a conventional NHRP process 200 for creating an SVC between a source router and a destination router after a specific number of packets are transmitted. Initially, in operation 202 a count variable is set to zero. Next, a first packet is sent by a permanent virtual circuit (PVC) in operation 204. After the first packet is sent, it is then determined whether there are any more packets to be sent in operation 206. If more packets need to be sent, in operation 208 the count variable is incremented by one. On the other hand, if there are no more packets, the process 200 ends after completion of operation 206.

After the count variable is incremented in operation 208, it is then determined whether the count variable is greater than a predetermined value in operation 210. The predetermined value is set to a value that indicates that a significant number of data packets have traveled from the source to the destination. If the count variable is not greater than the predetermined value, a next packet is sent by PVC in operation 212. However, if the count variable is greater than the predetermined value, a switched virtual circuit (SVC) is created in operation 214 (continued at "A" in FIG. 2B). After the SVC is created, the next packet is sent by SVC in operation 216.

In operation 218, it is determined whether there are any more packets to be sent over the network. This determination operation also typically includes waiting for a predetermined period of time. This period of time is to allow a minimum amount of idle time between data packet transmissions before the SVC is destroyed. If there are more packets to be sent, operation 216 is repeated and a next packet is sent by SVC. Operation 216 is repeated for all remaining packets. When there are no more packets to be sent, the SVC is dismantled in operation 220. The process 200 ends after tearing down the SVC.

Although the above described process 200 is preferable to using the default NHRP process, wherein an SVC is created for each packet, the process 200 is still likely to result in the creation of unnecessary SVC's. For example, if data is being transmitted at a relatively slow rate (e.g., typing on a keyboard), the PVC's may be sufficient for this purpose, and an SVC is not needed. Specifically, 100 packets may be sent over an hour to the destination if the destination is not popular, or may be sent in a second (such as during a file transfer). If an SVC is setup after 99 packets are sent to the destination, an SVC is needlessly created for the 100th packet for the 100 packets per hour case and not created soon enough for the 100 packets per second case.

In view of the foregoing, there is a need for methods and apparatuses for efficiently creating a temporary transit path between a source and next hop that is traffic dependent. Specifically, there is a need for a method to determine when to set up or tear down such a temporary transit path so that temporary trasit paths are set up when they are needed and torn down when they are no longer needed.

SUMMARY OF THE INVENTION

Accordingly, the present invention provides an apparatus and method for determining when to set up or tear down such a temporary transit path so that temporary transit paths are set up when they are needed and torn down when they are no longer needed. A temporary transit path is set up when the bit rate exceeds a first threshold. The temporary transit path is torn down when the bit rate is less than a second threshold.

The temporary transit path is set up or torn down between a source station's router and a next hop router. The temporary transit path is set up within a subnetwork that includes the source station, the next hop router, and an intermediate router that is interconnected by a plurality of permanent transit paths to the source station and the next hop router. In one embodiment, the temporary transit path is in the form of a switched virtual circuit and the permanent transit paths are in the form of permanent virtual circuits.

It should be appreciated that the present invention can be implemented in numerous ways, including as a process, an apparatus, a system, a device, a method, or a computer readable medium. Several inventive embodiments of the present invention are described below.

In one embodiment, a method for creating a temporary path for data packet transmission in the subnetwork is disclosed. Transmission of the data packets is initiated over the permanent transit paths that are coupled between the source station and the next hop router. A bit rate of the data packets from the source station to the next hop router is measured after initiating the transmission. Data packets transmission over the permanent transit paths is continued when the measured bit rate is below a first predetermined value. A temporary transit path between the source station and the next hop router is created when the measured bit rate is above the first predetermined value. The data packets are transmitted over the created temporary transit path when the measured bit rate is above the first predetermined value.

In a preferred embodiment, the bit rate is measured again after creating the temporary transit path and transmitting the data packets over the created temporary transit path. The created temporary transit path is torn down when the bit rate is below the second predetermined value. Transmission of the data packets is continued over the permanent transit paths from the source station to the next hop routers when the bit rate is below the second predetermined value. In another preferred embodiment, the second predetermined value is significantly lower than the first predetermined value such that the created temporary transit path is not dismantled due to minor fluctuations in the bit rate.

In another embodiment, the temporary transit path is created by sending a next hop request from the source station through the permanent transit paths to the next hop router whereby the next hop router replies and identifies itself as the next hop. The temporary transit path is then created in response to the next hop router reply and identification. In a preferred embodiment, the next hop request is in the form of next hop resolution protocol (NBRP).

In yet another embodiment, a computer readable medium containing program instructions for creating a transit path in the subnetwork is disclosed. The computer readable medium includes computer readable code for (a) initiating transmission of the data packets over the permanent transit paths that are coupled between the source station and the next hop router, (b) measuring a bit rate of the data packets from the source station to the next hop router after initiating the transmission; (c) continuing to transmit data packets over the permanent transit paths when the measured bit rate is below a first predetermined value; (d) creating a temporary transit path between the source station and the next hop router when the measured bit rate is above the first predetermined value; and (e) transmitting the data packets over the created temporary transit path when the measured bit rate is above the first predetermined value.

By way of an alternative embodiment, a computer data signal embodied in a carrier wave and representing sequences of instructions which, when executed by at least one processor, cause the at least one processor to create a temporary transit path in the subnetwork is disclosed. The at least one processor executes first computer readable code for (a) initiating transmission of the data packets over the permanent transit paths that are coupled between the source station and the next hop router; (b) measuring a bit rate of the data packets from the source station to the next hop router after initiating the transmission; (c) continuing to transmit data packets over the permanent transit paths when the measured bit rate is below a first predetermined value; (d) creating a temporary transit path between the source station and the next hop router when the measured bit rate is above the first predetermined value; (e) stopping transmission of the data packets over the permanent transit paths when the measured bit rate is above the first predetermined value; and (f) transmitting the data packets over the created temporary transit path when the measured bit rate is above the first predetermined value.

In another alternative embodiment, a source station router for creating a temporary transit path in the subnetwork is disclosed. The source station router includes a bit rate detector that is configured to measure a bit rate of data packets that are transmitted from the source station to the next hop router and to output a transmission control signal that indicates whether the measured bit rate is above the first predetermined value and whether the measured bit rate is below a second predetermined value. The source station router also includes a temporary transit path builder that is configured to receive the transmission control signal and to create a temporary transit path between the source station and the next hop router when the transmission control signal indicates that the measured bit rate is above a first predetermined value. The source station router further includes a data packet transmitter configured to receive the transmission control signal. The data packet transmitter is configured to transmit data packets over the at least one permanent transit path such that the data packet may be sent from the source station to the next hop router when the transmission control signal indicates that the measured bit rate is below the first predetermined value. The data packet transmitter is also configured to transmit data packets over the created temporary transit path such that the data packet may be sent from the source station to the next hop router when the transmission control signal indicates that the measured bit rate is above the first predetermined value.

The present invention has several advantages. For example, since temporary transit paths are only created after the bit rate has reached a first threshold, temporary transit paths are created only after the traffic to a specific destination has reached significant levels within a relatively short amount of time. Also, since the temporary transit path is torn down after the bit rate falls below a second threshold, the created temporary transit path does not needlessly consume resources by being maintained even after the traffic to the destination becomes sporadic. The second threshold values may be significantly less than the first threshold such that the temporary transit path is not created and destroyed when minor traffic fluctuations occur. The feature ensures that resources are not wasted on needlessly creating and dismantling temporary transit paths when the traffic bit rate to the destination fluctuates below the first threshold for a brief period of time, but quickly returns to a bit rate that is above the first threshold.

These and other features and advantages of the present invention will be presented in more detail in the following specification of the invention and the accompanying figures which illustrate by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE PREFERRED EMBODIMENTS

Reference will now be made in detail to the preferred embodiment of the invention. An example of the preferred embodiment is illustrated in the accompanying drawings. While the invention will be described in conjunction with that preferred embodiment, it will be understood that it is not intended to limit the invention to one preferred embodiment. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

The present invention provides a technique for creating a temporary transit path that is bit rate dependent and a system for implementing such technique. Although the following technique is described in terms of creating a switched virtual circuit (SVC), the technique may be easily applied to the creation of other types of temporary transit paths. Additionally, although the SVC is described as being created between a source station's router and an egress router, the technique is also applicable for creating an SVC between a source station's router and destination station's router. Additionally, the term source station refers to any component within a subnetwork that is capable of communicating either, directly or indirectly, with other components within the same subnetwork. By way of example, the source station may be in the form of a host, server, or router.

Figure 1A:
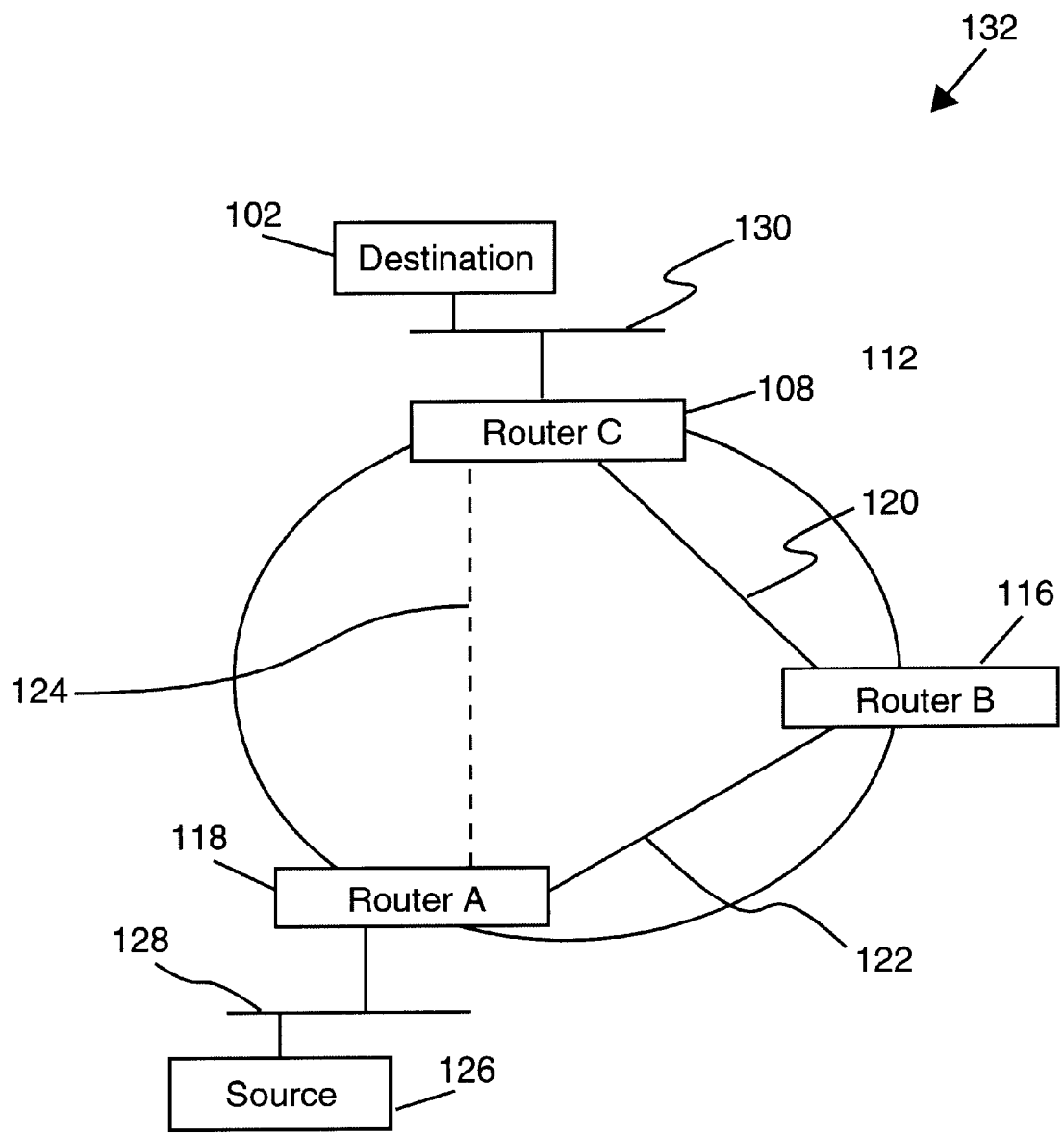
FIG. 1A is a diagrammatic representation of a conventional connection-oriented subnetwork.
Figure 1B:
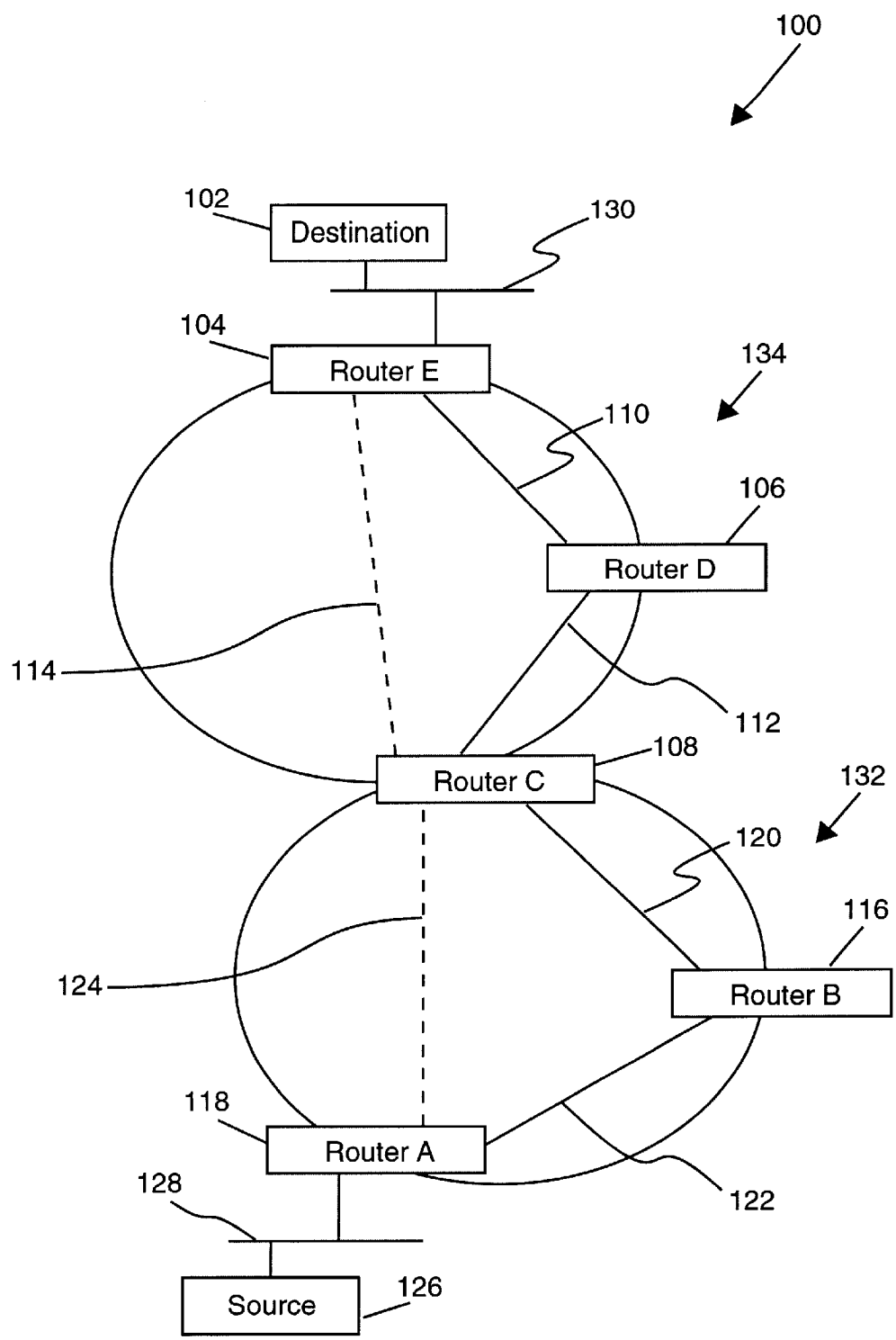
FIG. 1B is a diagrammatic representation of two connection-oriented subnetworks that share a common router (referred to as an "egress router") in accordance with one embodiment of the present invention.
Figure 2A:
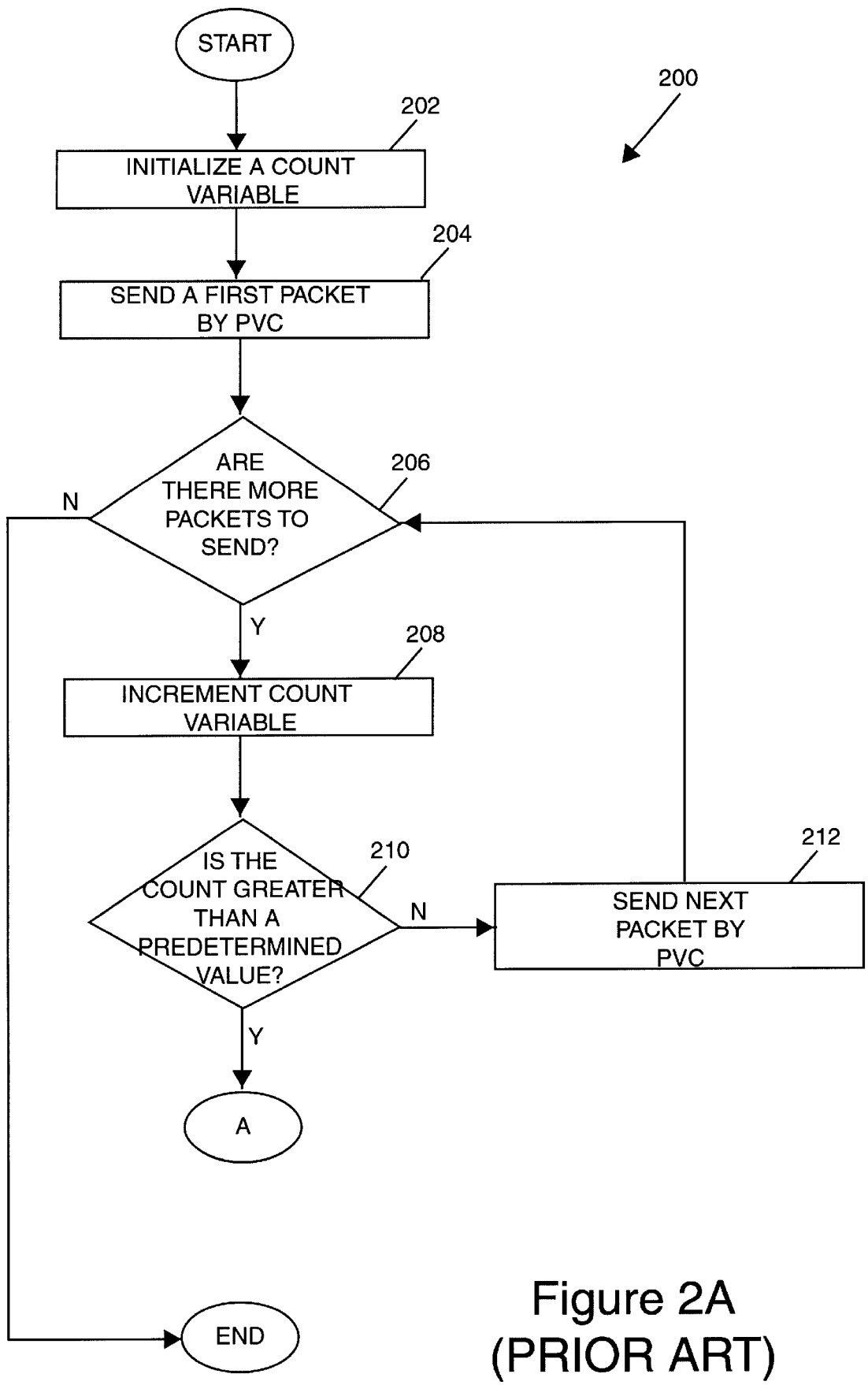
FIGS. 2A and 2B are flowcharts illustrating a conventional NHRP process for creating an SVC between a source station's router and a next hop router after a specific number of packets are transmitted.
Figure 2B:
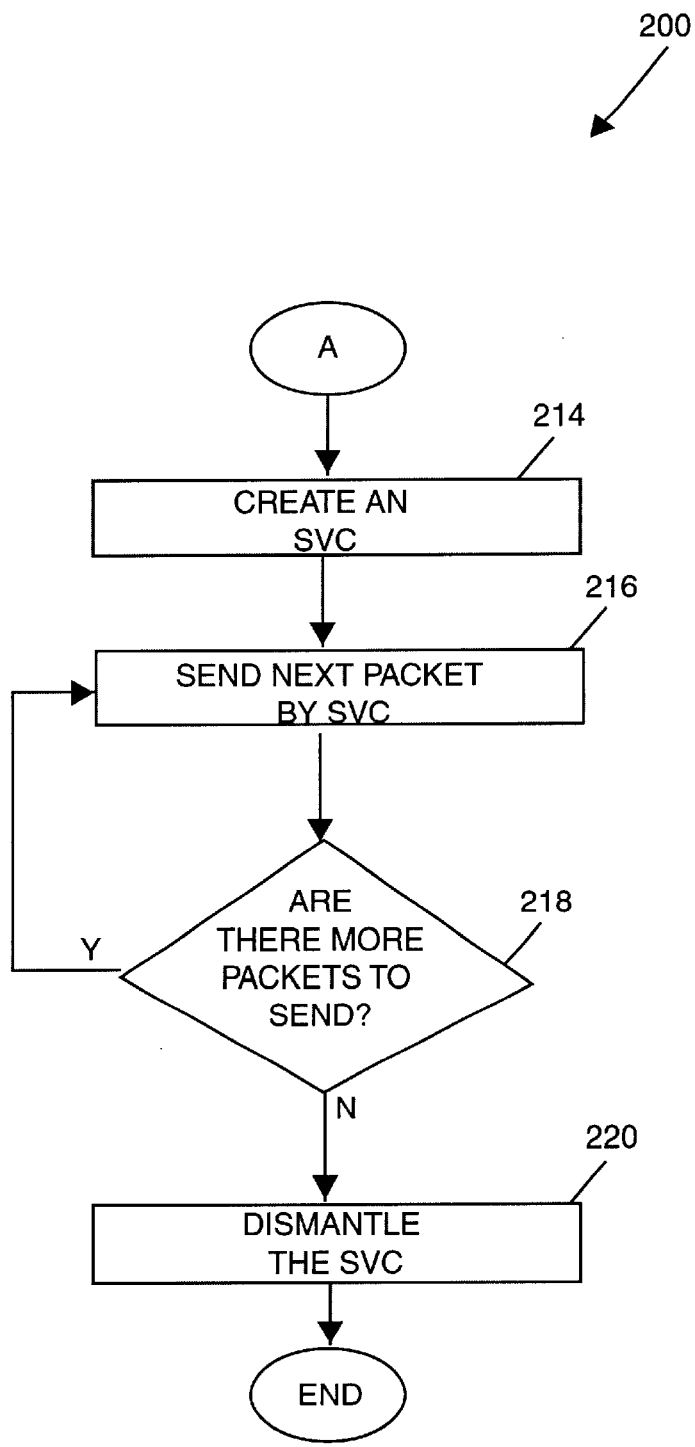

FIG. 1B shows an example of a hardware environment in which the present invention may be implemented. Specifically, FIG. 1B is a diagrammatic representation of two connection-oriented subnetworks that share a common router (referred to as an "egress router") in accordance with one embodiment of the present invention. Of course, the present invention may also be implemented on a conventional single subnetwork as shown in FIG. 1A.

As shown in FIG. 1B, a source station (or client platform) 126 is connected to router 104 which is connected via subnetworks 134 and 132 to a destination station 102. It will be assumed for the purposes of this discussion that the source station 126 is a single personal computer, that router 118 connects source station 126 to a first subnetwork (e.g., ATM or X.25 subnetwork or SMDS multicast group) and that the destination station 102 is connected to a second subnetwork by router 104.

A subnetwork is a network that includes routers that are capable of communicating with other routers within the same subnetwork. For example, within a non-broadcast, multi-access (NBMA) subnetwork, routers that have common network identifiers are capable of communicating with each other within the same NBMA subnetwork. For example, each of the routers A, B, and C may have a first network identifier, and each of the routers C, D, and E may have a second network identifier. Thus, routers A, B, and C may communicate with each other to form the first subnetwork 132, and routers C, D, and E may communicate with each other to form the second subnetwork 134. Since router C has both a first network identifier and a second network identifier, router C is a member of both the first subnetwork 132 and the second subnetwork 134. Thus, router C serves as a bridge between subnetworks 132 and 134.

Additionally, each subnetwork is a connection-oriented type network. That is, data packets are sent along either permanent transit paths (e.g., permanent virtual circuits) or along temporarily created transit paths (e.g., switched virtual circuits).

It should be noted, however, that a variety of configurations similar to this simple model may be employed without departing from the scope of the invention. For example, the source station 126 may be a personal computer or workstation which is part of a local or wide area network. Router 118 may be an internal router in a local network, a local network's general gateway to a wide area network, or some intermediate platform between a local network and the destination station 102 in a wide area network. The connection between router 104 of the destination station 102 and router 118 of the source station 126 may include several intervening routers (as shown). The first subnetwork 132 may represent a local or wide area network which includes the source 126 and router 118. The destination station 102 may be part of the local or wide area network, or a remote server on the same network.

Figure 3:
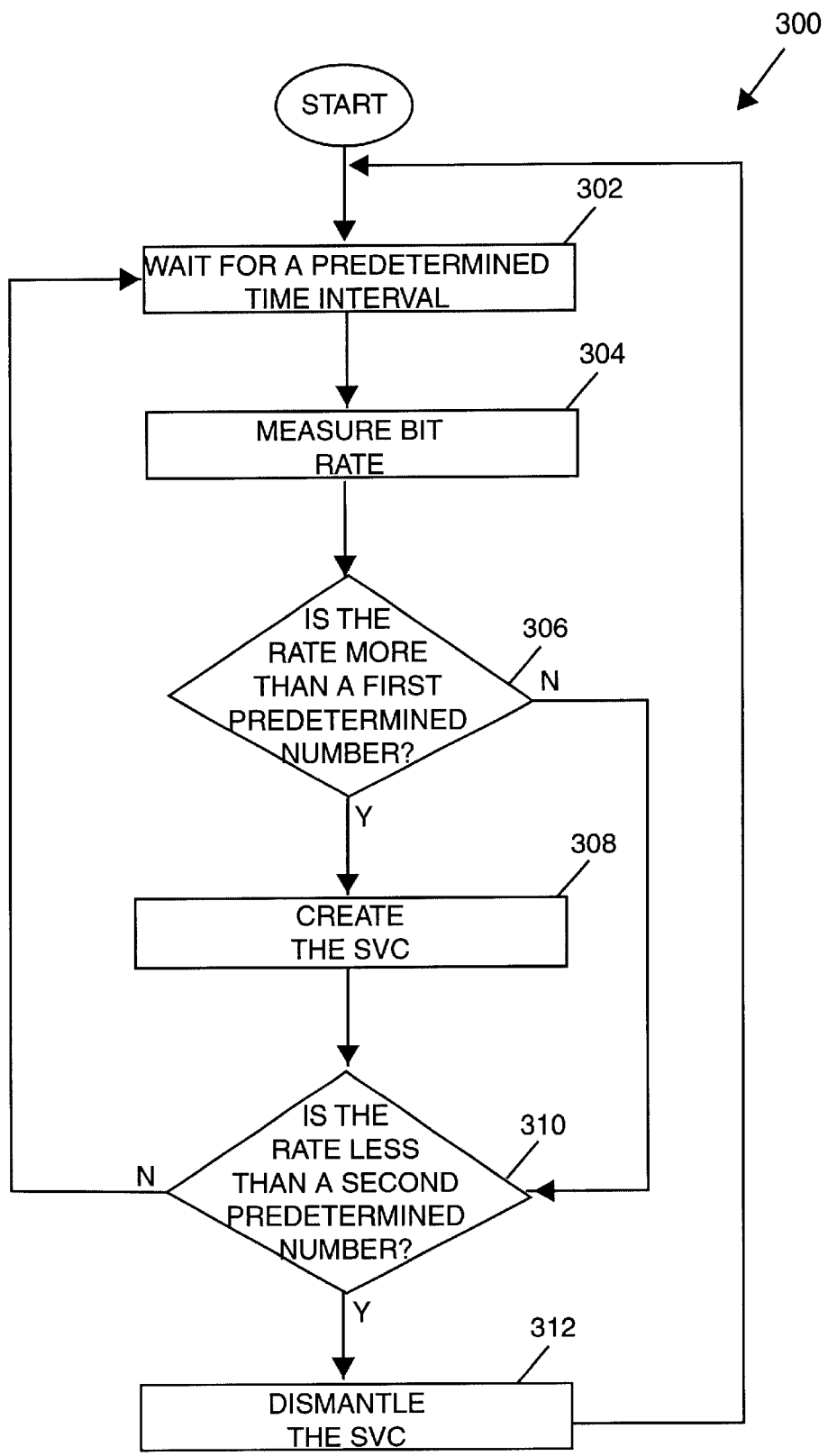
FIG. 3 is a flowchart illustrating a process for creating an SVC between the source station's router and the next hop router of FIG. 1B in accordance with one embodiment of the present invention.
Figure 4:
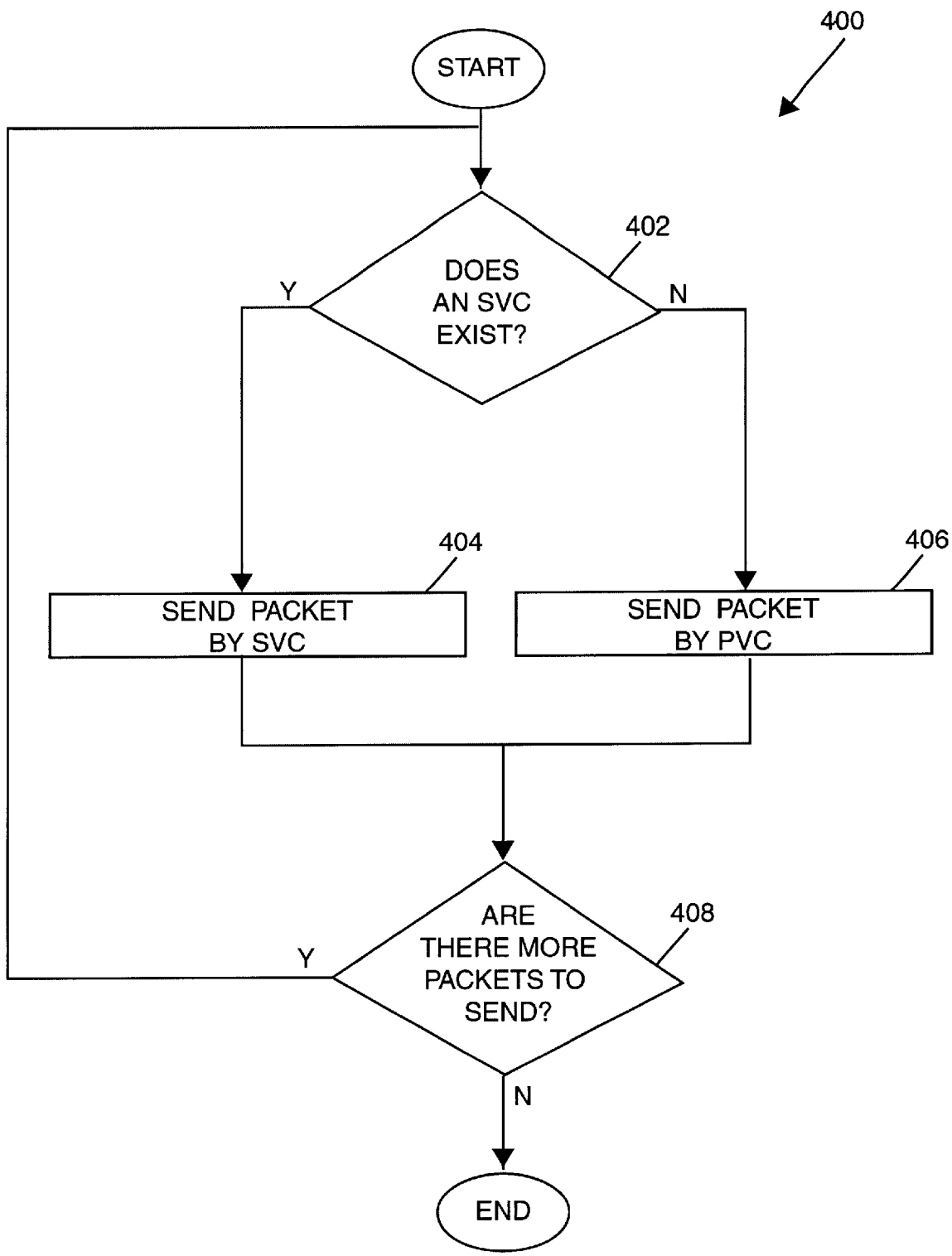
FIG. 4 is a flowchart illustrating a process for sending data packets from the source station's router and the next hop router of FIG. 1B in accordance with one embodiment of the present invention.

A specific embodiment of the invention will now be described with reference to the first subnetwork 132 of FIG. 1B and the flowcharts of FIGS. 3 and 4. FIG. 3 is a flowchart illustrating a process 300 for creating an SVC 124 between the source station's router 118 and the next hop router 108 of FIG. 1B in accordance with one embodiment of the present invention. FIG. 4 is a flowchart illustrating a process 400 for sending data packets from the source station's router 118 and the next hop router 108 of FIG. 1B in accordance with one embodiment of the present invention.

A next hop router is defined as either an egress router that is within the same subnetwork as the source station, or as the destination station's router if the destination station's router is located within the same subnetwork as the SVC requester (e.g., source station's router). In this embodiment, the next hop router is in the form of an egress router 108 that is capable of communicating with both subnetworks 132 and 134 as shown in FIG. 1B. The egress router may implement any suitable protocol, such as the border gateway protocol (BGP).

Turning now to FIG. 3, in operation 302 the source station router (or ingress router) 118 waits for a predetermined time interval. In operation 304, the ingress router 118 then measures the bit rate from the source station 126 to the next hop router 108 in operation 304. Any suitable technique for measuring the bit rate may be implemented. For example, a running total of the number of transmitted bits may be logged for a given time interval. The running total and time interval value may be used to calculate a bit rate for the given time interval. Preferably, the bit rate is calculated without using decimal numbers to avoid floating point calculations. For example, instead of dividing 100 Megabits by 0.1 sec, one would multiply 100 Megabits by 10. A plurality of bit rates may then be calculated for a plurality of given time intervals such that an average bit rate may be calculated.

In operation 306, it is then determined whether the bit rate is greater than or equal to a first predetermined value. (The term "above" means "greater than or equal to" in the following description). If it is determined that the bit rate is above the first predetermined value, an SVC 124 is created in operation 312 using conventional techniques. However, if the bit rate is not above the first predetermined value, the process 300 jumps to operation 310, which is described below.

The first predetermined value may be any suitable value that indicates that the traffic bit rate is high enough between the source station 126 and next hop router 108 to warrant the creation of an SVC 124. The chosen predetermined value depends on the requirements of the particular routers and components of the subnetwork 132, as well as the application of the particular subnetwork 132.

After an SVC is created, it is then determined whether the bit rate is less than or equal to a second predetermined value in operation 310. If the bit rate is less than the second predetermined value, the SVC 124 (if the SVC was created) is dismantled in operation 312. If the bit rate is not less than the second predetermined value, the SVC 124 is maintained (if the SVC was created) and the process 300 is repeated from the beginning at operation 302. The second predetermined value may be any suitable value and depends on the particular requirements of the application. Preferably, the second predetermined value is chosen such that an SVC 124 is not dismantled because of minor fluctuations in the bit rate. For example, the first predetermined value may be set to 20 Megabits per second, while the second predetermined value may be set to 1 Megabits per second. Thus, once packet traffic between the source 126 and next hop router 108 reaches 20 Megabits per second, the SVC 124 would be created and maintained even if the bit rate fluctuates to a level that is slightly below 20 Megabits per second.

In one embodiment, the SVC 124 is created using next hop resolution protocol (NHRP). However, any suitable protocol may be implemented for creating a temporary transit path within a connection-oriented subnetwork. Implementing NHRP, the ingress router 118 initially sends a "next hop" request along the PVC routes (e.g., 122 and 120) to the next hop router 108 (e.g., the egress router or the destination station's router). The next hop router 108 then replies to the next hop request and identifies itself to the ingress router 118 as the next hop to the destination station. The ingress router 118 may then create the SVC 124 between the ingress router 118 and the egress router 108 in response to the egress router's reply and identification.

In sum, an SVC 124 is created when the bit rate goes above the first predetermined value and dismantled when the bit rate falls below the second predetermined value. The process 300 may be executed concurrently with, or in parallel to, the process 400 that is described below in reference to FIG. 4.

In general terms, FIG. 4 describes process 400 for determining how to transmit each data packet. That is, process 400 is executed for each data packet. Alternatively, process 400 may be executed for a predetermined set of data packets. In one embodiment, prior to the transmission of each data packet, it is first determined whether an SVC 124 exists or has been created by process 300 of FIG. 3, for example. If the SVC 124 exists, the data packet is sent along the existing SVC 124. However, if the SVC 124 has not been created or has been recently dismantled, the data packet(s) is sent along PVC's 122 and 120 from the source station 126 to the next hop router 108.

After the data packet(s) have been transmitted either by SVC or PVC's, it is then determined whether there are more packets to send to the next hop router 108 in operation 408. If there are no more packets to send, the process 400 ends. If there are more packets to send to the next hop router 108, the process 400 returns to operation 402 and it is again determined whether the SVC 124 exists.

The above described processes 300 and 400 may be also implemented by the egress router 108 to determine whether to setup an SVC between itself and the destination station's router 104. That is, when the bit rate between router 108 and the destination station 102 rises above the first predetermined value, an SVC would be set up between the router 108 and destination station's router 104 so that data packets may be sent along the SVC. Otherwise, data packets are sent along PVC's 112 and 110. Likewise, the SVC may be dismantled after the bit rate falls below the second predetermined value. In sum, the present invention may be implemented across multiple subnetworks and between multiple egress routers.

Figure 5:
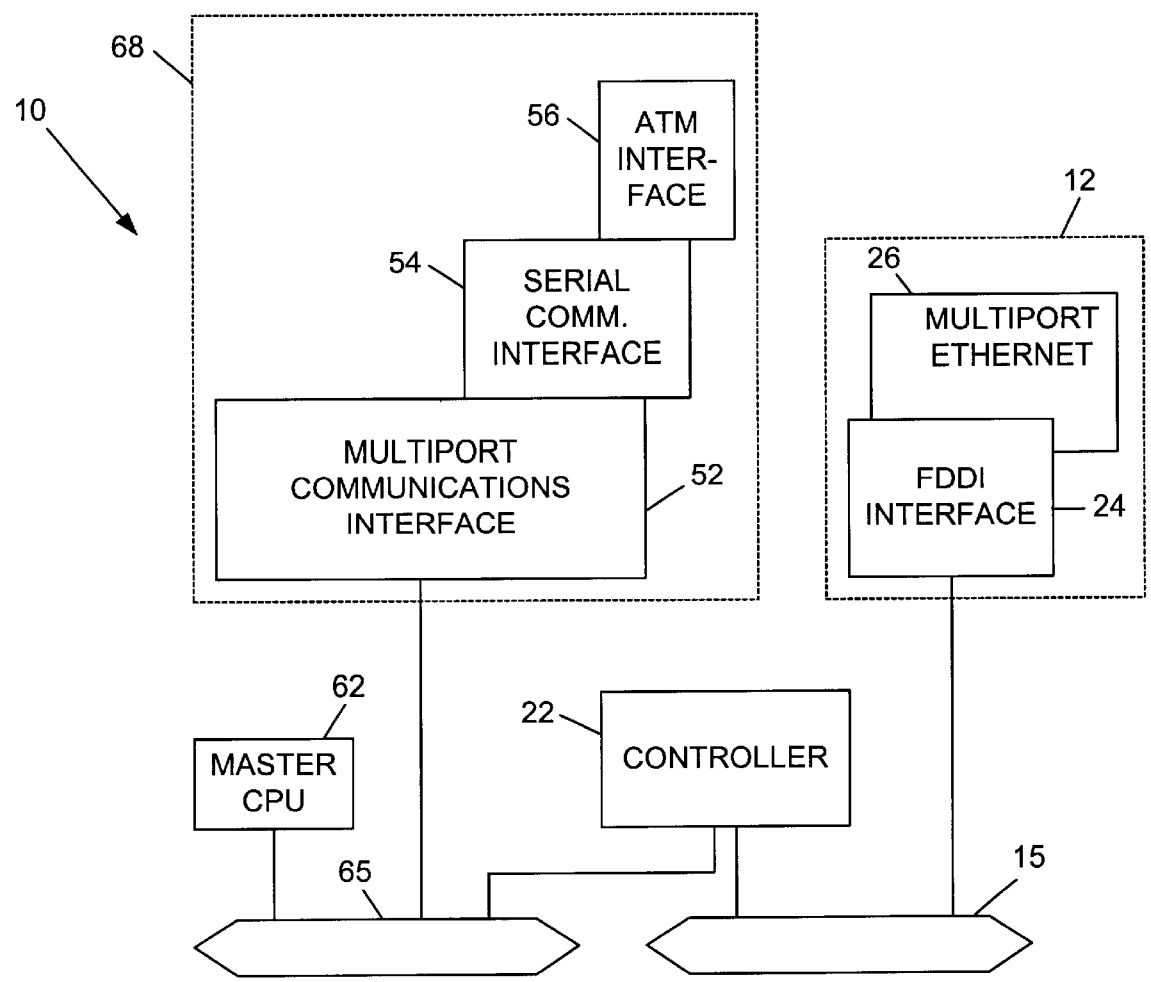
FIG. 5 is a diagrammatic representation of a router for implementing the process of FIGS. 3 and 4 in accordance with one embodiment of the present invention.

In one embodiment, the processes 300 and 400 are implemented on a router as shown in FIG. 5. Referring now to FIG. 5, a router 10 of the present invention includes a master central processing unit (CPU) 62, low and medium speed interfaces 68, and high speed interfaces 12. In preferred embodiments, the CPU 62 is responsible for such router tasks as routing table computations and network management. It may include one or more microprocessor chips selected from complex instruction set computer (CISC) chips, reduced instruction set computer (RISC) chips, or other available chips. In a preferred embodiment, non-volatile RAM and/or ROM also form part of CPU 62. However, there are many different ways in which memory could be coupled to the system.

The interfaces 62 and 68 are typically provided as interface cards. Generally, they control the sending and receipt of data packets over the network and sometimes support other peripherals used with the router 10. The low and medium speed interfaces 68 include a multiport communications interface 52, a serial communications interfaces 54, and an asynchronous transfer mode (ATM) interface 56. The high speed interfaces 12 include an FDDI interface 24 and a multiport ethernet interface 26. Preferably, each of these interfaces (Oow/medium and high speed) includes (1) a plurality of ports appropriate for communication with the appropriate media, and (2) an independent processor and in some instances (3) volatile RAM. The independent processors control such communications intensive tasks as packet switching and filtering, and media control and management. By providing separate processors for the communications intensive tasks, this architecture permits the master microprocessor 62 to efficiently perform routing computations, network diagnostics, security functions, etc.

The low and medium speed interfaces are coupled to the master CPU 62 through a data, control, and address bus 65. High speed interfaces 12 are connected to the bus 65 through a fast data, control, and address bus 15 which is in turn connected to a bus controller 22. The bus controller functions are provided by a processor.

Although the system shown in FIG. 5 is a preferred router of the present invention, it is by no means the only router architecture on which the present invention can be implemented. For example, an architecture having a single processor that handles communications as well as routing computations, etc. would also be acceptable. Further, other types of interfaces and media could also be used with the router.

The present invention may be implemented on a source station's router in any suitable configuration. For example, the source station's router may be configured to include a bit rate detector for measuring a bit rate of data packets that are transmitted from the source station to the next hop router. The bit rate detector may be further configured to output a transmission control signal that indicates whether the measured bit rate is above a first predetermined value or below a second predetermined value. The source station's router may also include a temporary transit path builder for creating a temporary transit path between the source station's router and the next hop router. The temporary transit path builder may be configured to receive the transmission control signal and to build or tear down the temporary transit path in response to the transmission control signal. For example, the builder may create (or make a request to construct) a temporary transit path when the transmission signal indicates that the bit rate is above the first predetermined value, and may dismantle the created temporary transit path when the transmission signal indicates that the bit rate is below the second predetermined value.

The source station's router may also include a data packet transmitter that is configured to receive the transmission control signal and to transmit data packets along permanent transit paths when the transmission signal indicates that the bit rate is not above the first predetermined value or falls below the second predetermined value. The data packet transmitter may also be configured to transmit data packets along a temporary transit path when the transmission signal indicates that the bit rate is above the first predetermined value or hasn't fallen below the second predetermined value.

Although the foregoing invention has been described in some detail for purposes of clarity of understanding, it will be apparent that certain changes and modifications may be practiced within the scope of the appended claims. It should be noted that there are many alternative ways of implementing both the process and apparatus of the present invention. Accordingly, the present embodiments are to be considered as illustrative and not restrictive, and the invention is not to be limited to the details given herein, but may be modified within the scope and equivalents of the appended claims.

What is claimed is:

1. A method for creating a temporary transit path for data packet transmission in a subnetwork, the subnetwork having a source station, a next hop router, and an intermediate router that is interconnected by a plurality of permanent transit paths to the source station and the next hop router, the method comprising the acts of:
   (a) initiating transmission of the data packets over the permanent transit paths that are coupled between the source station and the next hop router;
   (b) measuring a bit rate of the data packets that are transmitted from the source station to the next hop router;
   (c) continuing to transmit data packets over the selected permanent transit paths when the measured bit rate is below a first predetermined value;
   (d) creating a temporary transit path between the source station and the next hop router when the measured bit rate is above the first predetermined value; and
   (e) transmitting the data packets over the created temporary transit path when the measured bit rate is above the first predetermined value.

2. A method as recited in claim 1, further comprising the act of stopping transmission of the data packets over the permanent transit paths when the measured bit rate is above the first predetermined value.

3. A method as recited in claim 1, further comprising the acts of:
   repeating act (b) after creating the temporary transit path and continuing transmission of the data packets over the created temporary transit path;
   tearing down the created temporary transit path when the bit rate is below the second predetermined value; and
   continuing transmission of the data packets over the permanent transit paths from the source station to the next hop routers when the bit rate is below the second predetermined value.

4. A method as recited in claim 3, further comprising the act of stopping transmission of the data packets over the temporary transit path when the bit rate is below a second predetermined value and before tearing down the created temporary transit path.

5. A method as recited in claim 3, wherein the second predetermined value is significantly lower than the first predetermined value such that the created temporary transit path is not dismantled due to minor fluctuations in the bit rate.

6. A method as recited in claim 1, the act of creating a temporary transit path is accomplished by the acts of:
    sending a next hop request from the source station through the permanent transit paths to the next hop router such that the next hop router replies and identifies itself as the next hop; and
    creating the temporary transit path in response to the next hop router reply and identification.

7. A method as recited in claim 6, wherein the next hop request is in the form of next hop resolution protocol.

8. A method as recited in claim 1, wherein the temporary transit path is in the form of a switched virtual circuit and the permanent transit paths are in the form of permanent virtual circuits.

9. A method as recited in claim 8, wherein the subnetwork is a connection-oriented type that supports asynchronous transfer mode (ATM) service.

10. A method as recited in claim 1, wherein the next hop router is an egress router coupled to a second subnetwork that includes a destination station to which the data packets are also being sent by the egress router.

11. A method as recited in claim 10, further including the act of creating a second temporary transit path for data packet transmission in the second subnetwork, the subnetwork having the egress router, a second next hop router, and a second intermediate router that is interconnected by a plurality of second permanent transit paths to the egress router and the second next hop router, the method comprising the acts of:
    initiating transmission of the data packets over the second permanent transit paths that are coupled between the egress router and the second next hop router;
    measuring a bit rate of the data packets from the egress router to the second next hop router after initiating the transmission;
    continuing to transmit data packets over the second permanent transit paths when the measured bit rate is below the first predetermined value;
    creating a second temporary transit path between the egress router and the second next hop router when the measured bit rate is above the first predetermined value; and
    transmitting the data packets over the second created temporary transit path when the measured bit rate is above the first predetermined value.

12. A method as recited in claim 11 further comprising the act of stopping transmission of the data packets over the second permanent transit paths when the measured bit rate is above the first predetermined value.

13. A computer readable medium containing program instructions for creating a transit path in a subnetwork, the subnetwork including a source station, a next hop router, and an intermediate router that is interconnected by a plurality of permanent transit paths to the source station and the next hop router, the computer readable medium comprising:
    (a) computer readable code for initiating transmission of the data packets over the permanent transit paths that are coupled between the source station and the next hop router;
    (b) computer readable code for measuring a bit rate of the data packets from the source station to the next hop router after initiating the transmission;
    (c) computer readable code for continuing to transmit data packets over the permanent transit paths when the measured bit rate is below a first predetermined value;
    (d) computer readable code for creating a temporary transit path between the source station and the next hop router when the measured bit rate is above the first predetermined value; and
    (e) computer readable code for transmitting the data packets over the created temporary transit path when the measured bit rate is above the first predetermined value.

14. A computer readable medium as recited in claim 13, further comprising computer readable code for stopping transmission of the data packets over the permanent transit paths when the measured bit rate is above the first predetermined value.

15. A computer readable medium as recited in claim 13, further comprising:
    computer readable code for repeating act (b) after creating the temporary transit path and continuing transmission of the data packets over the created temporary transit path;
    computer readable code for tearing down the created temporary transit path when the bit rate is below the second predetermined value; and
    computer readable code for continuing transmission of the data packets over the selected permanent transit paths from the source station to the next hop routers when the bit rate is below the second predetermined value.

16. A computer readable medium as recited in claim 11, wherein the second predetermined value is significantly lower than the first predetermined value.

17. A computer readable medium as recited in claim 10, the computer readable medium for creating a temporary transit path further comprising:
    computer readable code for sending a next hop request from the source station through the selected permanent transit paths to the next hop router such that the next hop router replies and identifies itself as the next hop; and
    computer readable code creating the temporary transit path based in response to the next hop router reply and identification.

18. A computer readable medium as recited in claim 13, wherein the next hop request is in the form of next hop resolution protocol.

19. A computer readable medium as recited in claim 10, wherein the temporary transit path is in the form of a switched virtual circuit and the permanent transit paths are in the form of permanent virtual circuits.

20. A computer readable medium as recited in claim 13, wherein the next hop router is an egress router coupled to a second subnetwork that includes a destination station to which the data packets are also being sent by the egress router.

21. A computer readable medium as recited in claim 20, further comprising computer readable code for creating a second transit path for data packet transmission in the second subnetwork, the subnetwork having the egress router, a second next hop router, and a second intermediate router that is interconnected by a second plurality of permanent transit paths to the egress router and the second next hop router, the computer readable code for creating the second transit path further comprising:
    computer readable code for initiating transmission of the data packets over selected ones of the second permanent transit paths that are coupled between the egress router and the second next hop router;

computer readable code for measuring a bit rate of the data packets from the egress router to the second next hop router after initiating the transmission;

computer readable code for continuing to transmit data packets over the second permanent transit paths when the measured bit rate is below the first predetermined value;

computer readable code for creating the second temporary transit path between the egress router and the second next hop router when the measured bit rate is above the first predetermined value;

computer readable code for stopping transmission of the data packets over the second permanent transit paths when the measured bit rate is above the first predetermined value; and computer readable code for transmitting the data packets over the second created temporary transit path when the measured bit rate is above the first predetermined value.

22. A computer data signal embodied in a carrier wave and representing sequences of instructions which, when executed by at least one processor, cause the at least one processor to create a temporary transit path in a subnetwork, the subnetwork including a source station, a next hop router, and an intermediate router that is interconnected by a plurality of permanent transit paths to the source station and the next hop router, the at least one processor performing the acts of:

executing first computer readable code for initiating transmission of the data packets over the permanent transit paths that are coupled between the source station and the next hop router;

executing second computer readable code for measuring a bit rate of the data packets from the source station to the next hop router after initiating the transmission;

executing third computer readable code for continuing to transmit data packets over the permanent transit paths when the measured bit rate is below a first predetermined value;

executing fourth computer readable code for creating a temporary transit path between the source station and the next hop router when the measured bit rate is above the first predetermined value;

executing fifth computer readable code for stopping transmission of the data packets over the permanent transit paths when the measured bit rate is above the first predetermined value; and executing sixth computer readable code for transmitting the data packets over the created temporary transit path when the measured bit rate is above the first predetermined value.

23. A source station router for creating a temporary transit path in a subnetwork, the subnetwork including a source station, the source station router, a next hop router, and an intermediate router that is interconnected by a plurality of permanent transit paths to the source station and the next hop router, the source station router comprising:

a bit rate detector that is configured to measure a bit rate of the data packets from the source station to the next hop router and to output a transmission control signal that indicates whether the measured bit rate is above the first predetermined value and whether the measured bit rate is below a second predetermined value;

a temporary transit path builder configured to receive the transmission control signal and to create a temporary transit path between the source station and the next hop router when the transmission control signal indicates that the measured bit rate is above a first predetermined value; and a data packet transmitter configured to receive the transmission control signal, the data packet transmitter being configured to transmit data packets over the at least one permanent transit path such that the data packet may be sent from the source station to the next hop router when the transmission control signal indicates that the measured bit rate is below the first predetermined value, and the data packet transmitter being configured to transmit data packets over the created temporary transit path such that the data packet may be sent from the source station to the next hop router when the transmission control signal indicates that the measured bit rate is above the first predetermined value.

24. A source station router as recited in claim 23, wherein the temporary transit path building is further configured to tear down the created temporary transit path between the source station and the next hop router when the transmission control signal indicates that the measured bit rate is below the second predetermined value.

* * * * *